Aug. 4, 1925.
H. LADERER
PIPE JOINT
Filed June 13, 1924
1,548,533
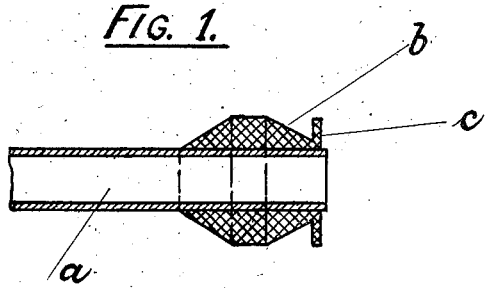
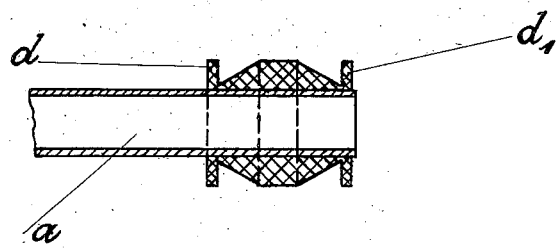
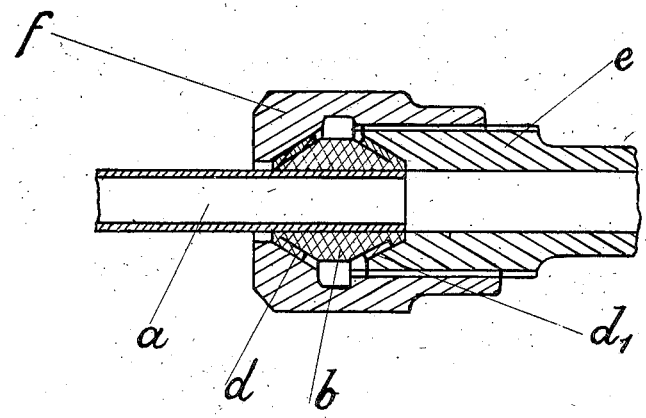
Inventor
Hugo Laderer Patented Aug. 4, 1925.

1,548,533

UNITED STATES PATENT OFFICE.

HUGO LADERER, OF CANNSTATT, GERMANY.

PIPE JOINT.

Application filed June 13, 1924. Serial No. 719,912.

*To all whom it may concern:*

Be it known that I, HUGO LADERER, a German citizen, and residing at 46 Fabrikstrasse, Cannstatt, Germany, have invented certain new and useful Improvements in Pipe Joints, of which the following is a specification.

This invention relates to a packing ring for pipe joints, which is pressed on to the pipe by being pressed between a nipple and a screw cap or cap nut. The known packing rings of this type are for instance conical at both ends and engage in correspondingly turned parts of the nipple and the screw cap. In order to press such a ring on to the pipe, the entire mass of the ring, which offers a uniform resistance, must be compressed, the consequence being that it is very difficult to screw up the joint tightly, as it is not possible to ascertain by the feel whether the ring is tight or not. Hence it not infrequently occurs that, by being screwed up too tightly and cracking, the packing ring seizes the nut. In order to overcome this drawback, according to the present invention the packing ring is cut away conically in such a manner that disc-shaped portions are formed which, on the cap nut being tightened up, are laid over on to the conical jointing surface and, on the nut being further tightened, are so pressed against the said surface that the degree of pressure, with which the packing ring is pressed against the pipe end, can be regulated by feel.

In the accompanying drawing two constructional examples of the invention are shown.

Fig. 1 shows a pipe end $a$, on which is slipped a conical ring $b$, which is cut away behind one of its end faces so as to leave a disc-shaped part $c$.

Fig. 2 shows a pipe end, on which a conical ring $b$ is slipped, which is cut away behind both end faces so as to leave disc-shaped parts $d$ and $d^1$ at the two ends.

In Fig. 3 the conical ring $b$ is shown placed on the pipe end. When placed in position it has the form shown in Fig. 2. By screwing up the union $e$, $f$, the disc-shaped parts $d$, $d^1$ are first laid over. On the union being further tightened, the conical ring is firmly pressed against the pipe end, the ring giving gradually and uniformly, as it is compressed. This has the advantage that the tightening required for pressing the ring on to the pipe can be regulated by feel, so that there will be no sudden pressure, which might cause seizing.

What I claim is:—

A pipe joint comprising in combination a nipple the end of which is internally countersunk, a packing ring intended to be loosely mounted on the end of the pipe to be connected with the nipple, the said packing ring being formed at its ends with discs at right angles to the axis of the nipple, and having conical surfaces tapering from its centre part towards the said discs, the said conical surfaces being smooth without depressions therein, and an internally coned screw cap by means of which the packing ring is tightened up, whereby during the tightening, the discs at the ends of the packing ring are pressed towards the smooth conical surfaces thereof and forced to assume the form of the latter surfaces.

In testimony whereof I have signed my name to this specification.

HUGO LADERER.